Feb. 11, 1941. A. RAMBOLD Re. 21,714

BAG

Original Filed May 31, 1935 2 Sheets-Sheet 1

INVENTOR
ADOLF RAMBOLD,
By John Q. Grady
Attorney

Feb. 11, 1941. A. RAMBOLD Re. 21,714

BAG

Original Filed May 31, 1935 2 Sheets-Sheet 2

INVENTOR
ADOLF RAMBOLD,
John B. Brady
Attorney

Reissued Feb. 11, 1941

Re. 21,714

UNITED STATES PATENT OFFICE 21,714

BAG

Adolf Rambold, Dresden, Germany

Original No. 2,085,509, dated June 29, 1937, Serial No. 24,416, May 31, 1935. Application for reissue April 20, 1939, Serial No. 269,062. In Germany June 28, 1934

5 Claims. (Cl. 229—53)

This invention relates to bags, which may be perforated and utilised as infusion packages, or which may be imperforate and utilised as sales packages.

An object of the invention is to provide a new and improved bag in which a tight seal is obtained without the use of adhesive.

A glueless bag in accordance with the invention is made from an integral blank of material comprising a smooth continuous bottom and at least two opposite smooth continuous sides, at least two other sides being formed by folded lateral portions of said continuous sides, an outer portion of the bottom being thrust between each two of said lateral portions, said outer portion of the bottom being over-and-over folded together with said lateral portions, the edge of said outer bottom portion being retained near the edges of the adjacent lateral portion thereby automatically to form when folded a tight seam.

The method of making the bag comprises folding the blank into substantially U-shape to form a smooth continuous bottom for the bag, thrusting each outer portion of the bottom up between the adjacent lateral portions, locating and maintaining the edge of each outer bottom portion near the edges of the adjacent lateral portions, folding said lateral portions and the intervening outer bottom portions over and over upon themselves automatically to close the seams, and flattening each of the folded portions.

The invention further consists in doubly securing a holder string to the bag by the clamping action of a staple, for which purpose the end of the string is placed over the edge of the bag loop-fashion and is gripped by the staple at two points. A notch may be provided in the edge of the bag for guiding and securing the holder string.

In order that the bag may be utilised as an infusion package, it is necessary that liquid may pass therethrough, and if it is not inherently pervious, as are for example fabric materials, it is provided with apertures. For example, the bag may be perforated in known manner.

An advantage of the invention is that the adhesives hitherto utilised for forming bags or infusion packages are avoided, thereby making it possible to form a cheap packing harmless for the contents.

Various embodiments of the invention are illustrated in the accompanying drawings.

In the production of the bag a rectangular blank is utilised, which is folded in known manner, namely, U-fashion, upon a rectangular core.

Figure 9:
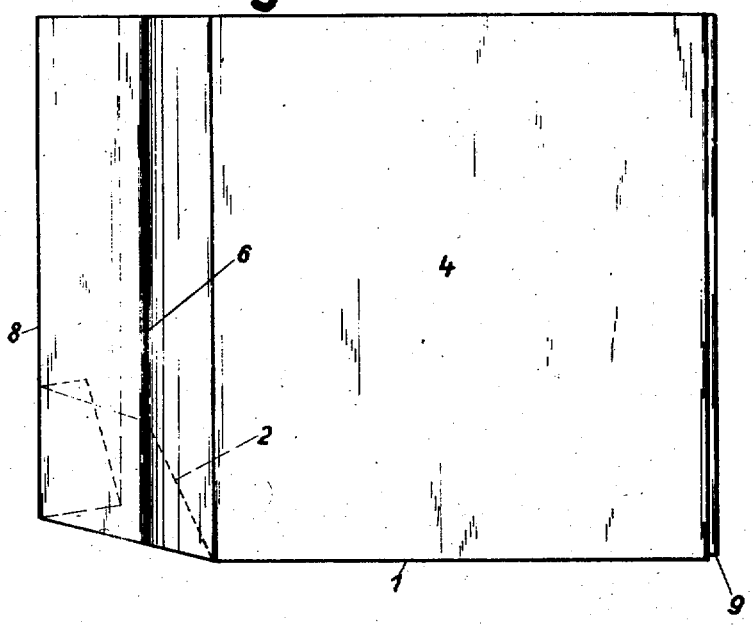
Fig. 9 is an elevation corresponding to Fig. 8.

The bottom of the bag to be produced is indicated at 1. Integral parts of the bottom projecting at the two narrow sides are indicated by the reference numerals 2 and 3, while the portions of the blank which are folded up from the bottom are indicated at 4 and 5. From the figures it will be clear that the part 2 of the bottom which extends beyond the base area of the bag is thrust upwards between the laterally projecting edges of the upstanding walls 4 and 5 which are to be folded together on to the core. An inner triangular portion of the projecting base is pressed upwardly towards the core while the remainder of said projecting base is doubled upwardly upon itself into parallelism with the laterally projecting upstanding walls, the edge of each outer base portion being retained near the edges of the laterally projecting upstanding walls. Consequently when these walls are folded together twice for forming a tight side seam the bottom portion 2 located between them is folded twice therewith. The same applies to the bottom portion 3. The folding lines are indicated at 6, 7 and 8. It is noteworthy that the lower edge 9 of the folding (Figs. 9 and 10) is nearly level with the bottom 1 of the bag.

Figure 10:
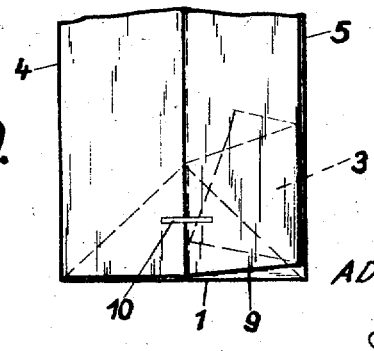
Fig. 10 is a side elevation of the finished bag, part being broken away.

The bag so made may be stapled, care being taken that the staples are applied at points where as many layers of material as possible may be gripped by them (see for example the staple 10 in Fig. 10).

Figure 6:
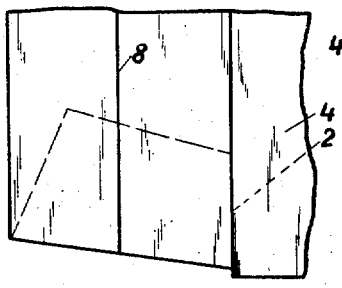
Fig. 6 is a front elevation of the bag, after the narrow side walls have been formed.
Figure 7:
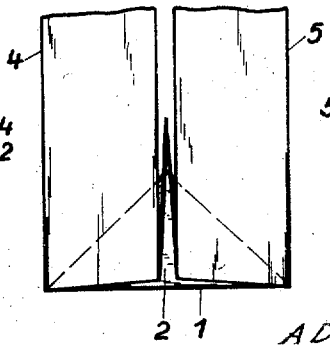
Fig. 7 is a side elevation corresponding to Fig. 6.
Figure 2:
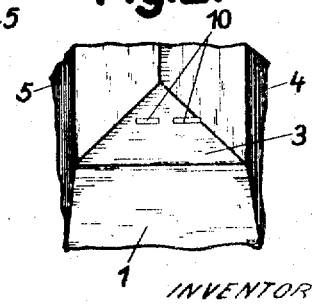
Fig. 2 shows part of the completed bag as seen from the inside.
Figure 8:
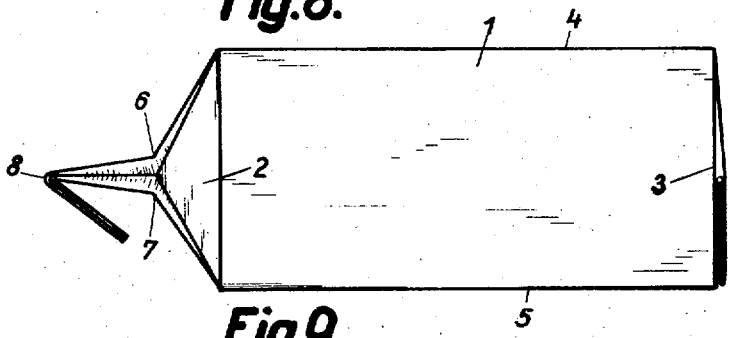
Fig. 8 shows the bag in bottom plan view, the folding being completed at one side.

Adequate tightness of sealing is obtained owing to the fact that the upturned bottom flaps 2 and 3 (as clearly shown in Fig. 6) extend substantially to the outer edge of the sides to be folded together.

Figure 1:
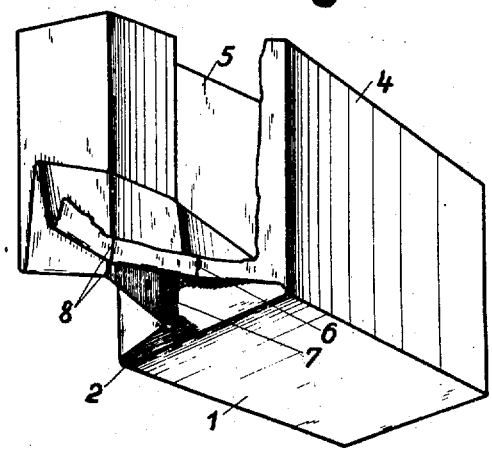
Fig. 1 shows how that portion of the bag bottom projecting over the ground area is to be thrust between the projecting ends of the side walls to be folded flat on to the core.
Figure 3:
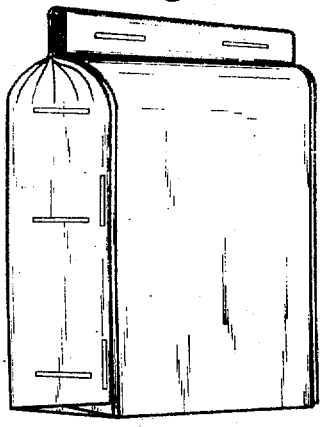
Fig. 3 represents a sales bag in accordance with the invention.
Figure 4:
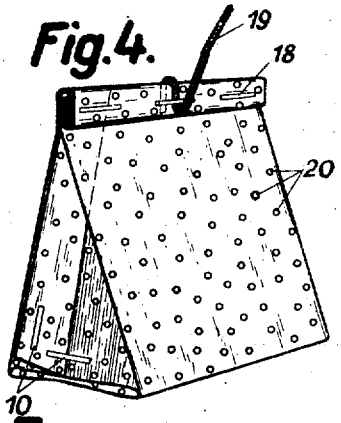
Fig. 4 illustrates an infusion bag.
Figure 5:
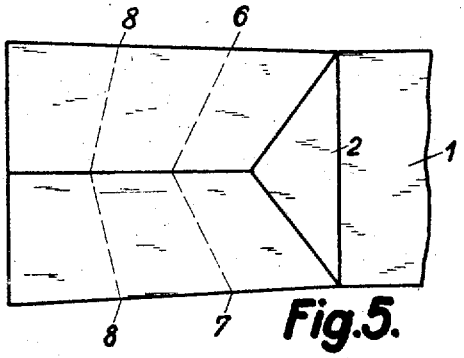
Fig. 5 shows diagrammatically part of a bag in plan in unfolded condition, but with the folding lines indicated.

In order to provide an absolutely safe seal at the top closure, staples 18 (Fig. 4) are employed. In this connection care must be taken that the longitudinal fold is engaged by the outermost staples. By the double top fold, which is secured in position by means of staples, a perfectly tight sealing down of the bag is assured. The staples 18 may also be utilised for fixing a label string 19, or for fixing a handle formed of a string and running from one outer staple to the other.

The holder string is preferably fixed by placing one of its ends loop-fashion over the edge of the bag and gripping it by a staple at two points, whereby safe connection is assured between the string and the bag.

If it is required to pass the string round the bag, a notch is provided at the top folding, preferably above the stapling of the edge of the bag, in which the other end of the holder string may be detachably fixed. The notch must be so disposed that the seal of the bag is not damaged and the contents thereof cannot escape. This arrangement gives the assurance that the string, particularly if it is provided with a label and if this is pushed under the string loop, retains its position.

If the bag described, which is preferably made of cellulosic material, is utilized as an infusion package, it may be provided in known manner with holes 20 (Fig. 4), which are adapted to permit entry of the water and "drawing" of the contents.

I claim:

1. A bag of polygonal cross section made from an integral blank of material, comprising a smooth continuous bottom and at least two opposite smooth continuous sides, at least two other sides being formed by folded lateral portions of said continuous sides, an outer portion of the bottom being thrust between each two of said lateral portions, said outer portion of the bottom being over-and-over folded together with said lateral portions, the edge of said outer bottom portion being retained near the edges of the adjacent lateral portions thereby automatically to form when folded a tight seam.

2. A bag according to claim 1, wherein the edges of the blank lie together and are covered by the folded portions thereof.

3. A bag comprising a rectangular blank of sheet material folded U-fashion with each outer portion of the bottom thrust between the two lateral portions at the same side, the outer portion of the bottom being over-and-over folded together with said lateral portions, and the edge of said outer portion being retained near the edges of the lateral portions thereby automatically to form when folded a tight seam.

4. The method of making a bag from a unitary blank of material which comprises folding said blank into substantially U-shape to form a smooth continuous bottom for the bag, thrusting each outer portion of the bottom up between the adjacent lateral portions, locating and maintaining the edge of each outer bottom portion near the edges of the adjacent lateral portions, folding said lateral portions and the intervening outer bottom portions over and over upon themselves automatically to close the seams, and flattening each of the folded portions.

5. The method of making a bag according to claim 4, including the step of stapling the flattened folded portions.

ADOLF RAMBOLD.